United States Patent [19]
Renner

[11] 3,937,019
[45] Feb. 10, 1976

[54] THERMAL ENGINE

[75] Inventor: Eckhard Renner, Achim, Germany

[73] Assignee: Vereinigte Flugtechnische Werke-Fokker GmbH, Bremen, Germany

[22] Filed: Oct. 25, 1974

[21] Appl. No.: 517,883

[30] Foreign Application Priority Data
Nov. 2, 1973 Germany............................ 2354722

[52] U.S. Cl. ................................................. 60/527
[51] Int. Cl.²............................................ F03G 7/06
[58] Field of Search....................... 60/527, 528, 529

[56] References Cited
UNITED STATES PATENTS

| | | | |
|---|---|---|---|
| 3,152,554 | 10/1964 | Kofink | 60/529 X |
| 3,229,177 | 1/1966 | Clarke | 60/527 X |
| 3,403,238 | 9/1968 | Buehler et al. | 60/527 X |
| 3,430,441 | 3/1969 | Adams | 60/529 |

*Primary Examiner*—Allen M. Ostrager
*Attorney, Agent, or Firm*—Ralf H. Siegemund

[57] ABSTRACT

A machine is constructed from plural elongated elements constructed as tubes or rods with double duct and which are alternatingly cooled and heated past a transition temperature, whereby restauration of the original length occurs during heating under development of force and is effective as work producing stroke, while upon cooling below the transition temperature such element is extended or upset. The elements are resiliently coupled to a crank shaft or to the rotary output of swash plate like machine. Heating and cooling fluid is alternatingly driven through the duct or ducts in the stroke producing elements to obtain periodic extension and contraction which is translated into rotational power.

15 Claims, 4 Drawing Figures

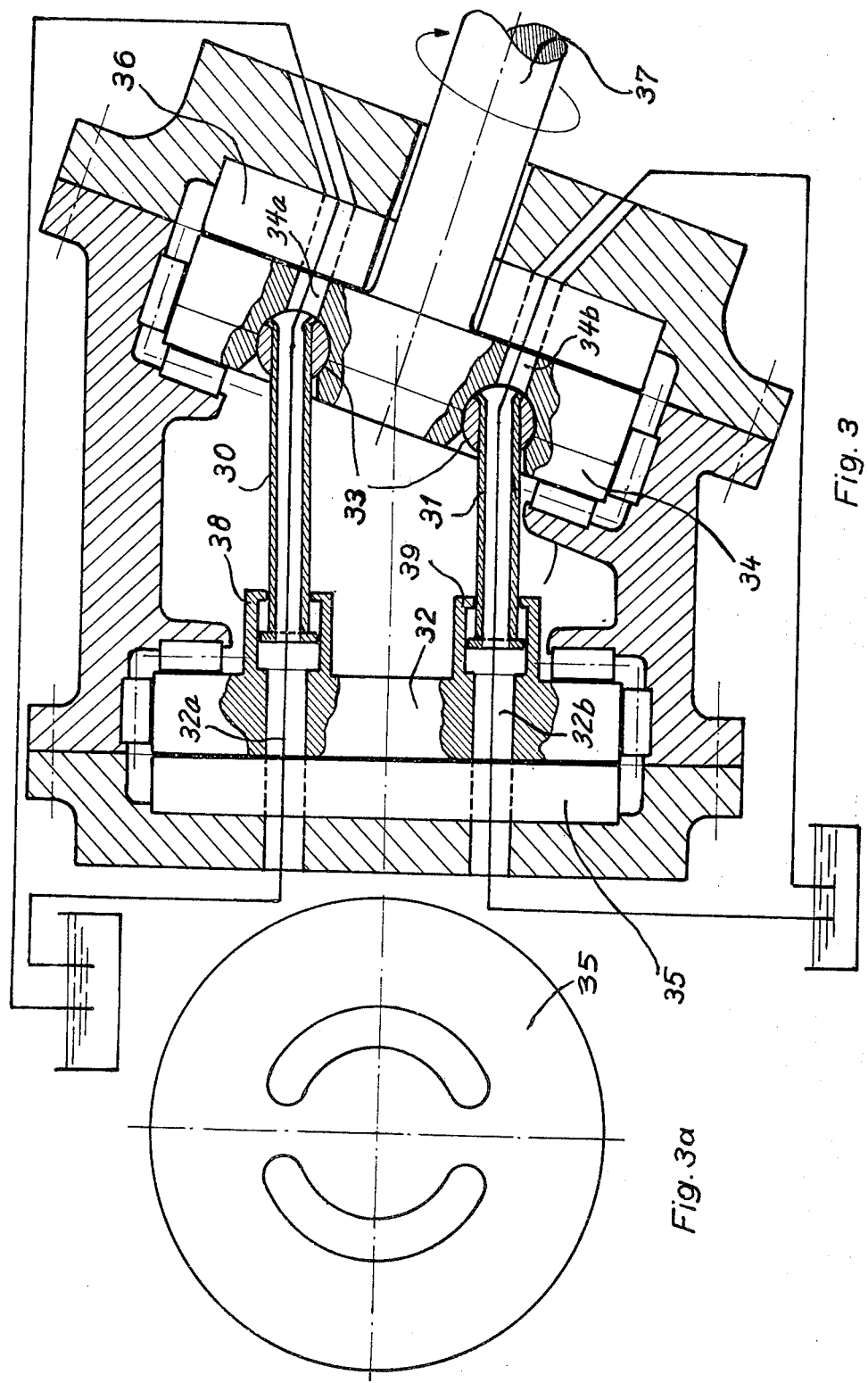

THERMAL ENGINE

BACKGROUND OF THE INVENTION

The present invention relates to a thermoengine with a displacement element analogous to piston strokes and operating particularly by converting thermal energy into mechanical energy.

The internal combustion engine is a type of engine which generates thermal energy through combustion and converts that energy into mechanical energy. Generally speaking, these engines are reciprocating pistons, rotary pistons or turbines. The conversion of thermal energy into mechanical energy as such is, however, independent from the actual construction of the machine. These machines use the phenomenon known as internal combustion according to which fuel burns at an accellerated rate producing pressure energy which is in one way or another converted into mechanical movement. It is known, however, that all of these machines are more or less noisy, produce pollutants and contaminants and run relatively inefficiently. Since the production of combustion is the modus operandi of these machines, the fuel must be used under conditions in which the generation and sustaining of combustion is the primary prerequisite. All other factors are secondary. While improvements on isolated aspects are still conceivable, the known internal combustion engine cannot be considered an optimum type of machine for converting theremal energy into mechanical energy.

DESCRIPTION OF THE INVENTION

It is an object of the present invention to provide a new and improved thermo-engine having a lifting and reciprocating, work-producing element which is highly efficient and can be operated under ecologically advantageous conditions.

In accordance with the preferred embodiment of the present invention, it is suggested to provide a plurality of elongated elements which change length mechanically under exertion of relatively low force in a first temperature range, while restoring their respective original length in a different tremperature range, particularly when exceeding a transition temperature range and under development of significant force. The elements each are exposed alternatingly to heating and cooling fluids, and the elements are elastically coupled to a rotating device or element (e.g. a disk or a crankshaft) to convert the resulting length expansion and contraction of the elements into rotary motion.

The invention, therefore, is to be seen in eliminating the thermocycle of gas heating and expansion of a combustion engine, and instead thermally produced, periodical length changes of these elongated elements are used.

In the preferred form of practicing the invention, elongated elements are constructed from a Nickel-Titanium alloy of the type disclosed, for example, in British Pat. No. 1,180,782. An elongated element made of such a material is rather easily deformible, such as longitudinal upsetting or compression or extension when below the so-called transition temperature range, while restoring to its original length when heated above that temperature range, resulting in a work producing stroke.

The fluids provide for alternating cooling below and heating above the transition range, whereby preferably the temperature spread of cooling and heating is a multiple of that transition range to permit these alternating contractions and expansions to occur in rapid sequence. The transition range is for instance from 130° to 140°C and the operating range is for instance from 110° to 160°C.

Preferably, one will provide ducts through these elements for alternating passage of heating and cooling fluid. The elastic coupling of the linearly expanding and contracting elements to the rotary output keeps hard impacts from the latter, as the change in longitudinal dimension of such elements occurs quite rapidly when traversing the critical, transition temperature range.

The heat exchange fluid will be heated preferably in a steady heating process that does not need to operate with combustion. Burning of clean fuel under conditions favorable to ecology can become the prime factor operation. Unlike in combustion engines, the requirement here is merely that an exothermic process be used which can be sustained as such. Thus, burning of fuel can readily be optimized as far as BTU output is concerned and/or as far as completeness of burning and avoiding formation of contaminant is concerned. The heat exchange fluid is preferably a liquid such as heat resisting oil.

It can readily be seen that the invention permits complete separation of the development of thermal energy from the mechanical-work producing process. The fluid heating the elements must be heated somehow, or more generally, the elements must be heated periodically in some fashion. It makes no difference where the thermal energy comes from.

As far as cooling is concerned, forced air cooling suffices, While such air could be used as cooling fluid, a heat exchange process with a cooling liquid, such as water, possibly with anti-freeze, is preferred so as to increase the heat exchange rate with the elongated elements. It can also be seen that ambient air readily suffices even under very different climate conditions.

The machine can be expected to have a long life, as the elements on internal tecture change, no outside wear is involved. The resulting internal cycle is such that an element restoring its original length on heating provides the force which causes length change in one or several elements which are cooled in the instant. However, the force developed on restauration is considerably higher than the force needed to compress or extend, as the case may be, one or several cooled elements.

DESCRIPTION OF THE DRAWINGS

While the specification concludes with claims particularly pointing out and distinctly claiming the subject matter which is regarded as the invention, it is believed that the invention, the objects and features of the invention and further objects, features and advantages thereof will be better understood from the following description taken in connection with the accompanying drawings in which:

FIG. 3 is partially a section view, partially diagram of the second example for practicing the preferred embodiment of the invention; and FIG. 3A is a side view of element 35 of FIG. 3.

Proceeding now to the detailed description of the drawings, FIG. 1 shows three elongated, work-stroke producing elements 10, 11 and 12. Preferably made from a titanium nickel alloy with a temperature dependent memory of the type disclosed in said British patent; it may be assumed that e.g. after annealing these elements have a particular length. They can be rather easily longitudinally compressed, i.e. upset when at a temperature for instance below 130°C. Upon heating these elements above the range, they restore to their original length under development of much greater force than needed for the low temperature upsetting of any such element, so that the force balance permits extraction of a useful output. A length change of about 10 percent is readily available here.

Figure 1:
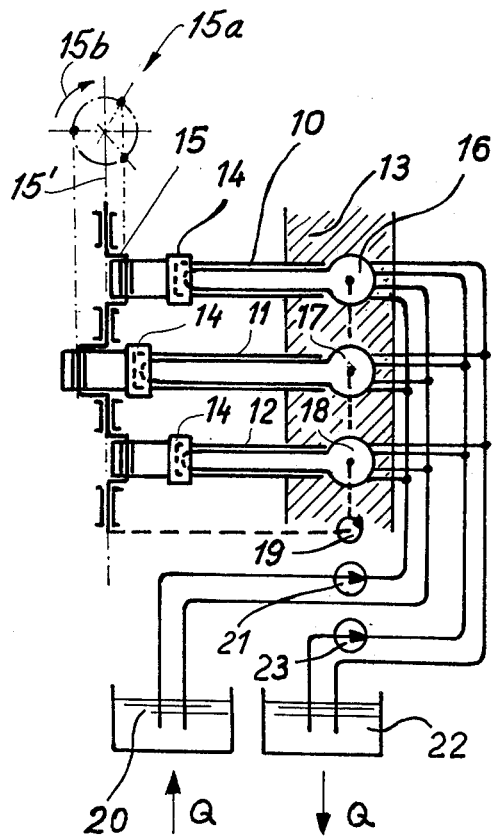
FIG. 1 is a somewhat schematic and diagrammatic illustration of a first example for practicing the preferred embodiment of the invention.

One end of each element is provided, e.g. with a transverse cylindrical configuration received in a corresponding socket in a housing 13. This wall all elements are pivotally connected to the housing. The pivot axes may be coaxial and extend transverse to the elongated extension of each element but parallel to an axis 15' for a rotational output. The other ends of these elements are connected to a crankshaft 15 as output and having that axis 15'. The connection is made in each instance through elastic connectors 14. The connection to the crank-shaft is made so that the points of engagement with the crank-shaft are apart by 120°. Arrow 15a points to an axial front projection of the connections as made relative to the axis 15' of the crank-shaft.

Each of the elements 10, 11, 12 is longitudinally traversed by two parallel bores which are fluid conductively interconnected adjacent the respective elastic connector 14. Rotary slide or disk valves 16, 17 and 18 respectively connect these bores alternatingly (as to each element) to a heating circulation 20 and to a cooling circulation 22, for driving heat exchange fluid through the ducts to obtain heating and cooling of the elements in alternating sequence as to each of them but with a phase among the three. Accordingly, each of the elements 10, 11, 12 is alternatingly cooled and heated, but at a phase shift explained as follows:

Generally speaking, the valves 16, 17, and 18 are under control of a controller 19, having the rotation of the crank-shaft 15 as an input. The operative connection between crank-shaft 15 and the valves is such that cooling cycle and heating cycle is operated for each element 10 to 12 in strict dependency upon the phase angles of rotation as representing the forward and retracted positions of the several elements. As a consequence, heating and cooling fluid is passed through these lements 10, 11, 12 in alternating sequence as to each element and with a 120° phase shift among the several elements causing the elements to alternatingly contract and expand, with the same phase shift.

In the illustrated position, with arrow 15b denoting the desired rotation, rod 10 is supposed to contract. Under the assumption that the elements expand when heated, valve 16 has passed and may still be passing cooling fluid into element 10, so that the element is cold while being upset by the crank-shaft. Element 11 is at maximum expansion and cooling fluid may just begin to be fed into and through its ducts. Element 12 is the one performing work at this point. It is being heated by heating fluid and it is expanding, turning the crank. Accordingly, the crank-shaft is driven by these elements to the extent they expand and contract.

The resulting stroke of expansion and contraction of each element is rather small but may be up to about 10 percent. The small stroke, however, is carried out under development of a significant amount of force. Even though the lever action on the crank-shaft is accordingly small, the resulting torque is of significant magnitude.

The operation could be carried out in the reverse in that the restoration of length of each element 10, 11, 12 involves its contraction on heating, while with comparatively little force they are extended when below the transition temperature range. Under such circumstances element 10 in FIG. 1 would still receive heating fluid to undergo and continue its contraction pursuant to higher temperature restoration of its length, while element 12 is cooled and undergoes extension by the crank-shaft.

The resilient coupler or connector 14 for each expanding and contracting element has a rather important function. It cushions the rather hard pushing and pulling action as provided by the respective element, whenever restoring it original configuration upon traversal of the transition temperature. The resiliency prevents also destruction of the machine in the case of malfunction.

It is of advantage to operate heating and cooling fluids at a temperature differential which is well in excess of the critical temperature range of the transition to obtain rapid traversal of that transition change so as to obtain rapid expansion and contraction in each instance. This permits development of relatively high rotational speeds at the crank-shaft, bearing in mind, however, that this is a low speed high torque machine.

By way of example, the heating fluid should have a temperature of for instance 60 centigrade and the cooling fluid may have room temperature.

Figure 2:
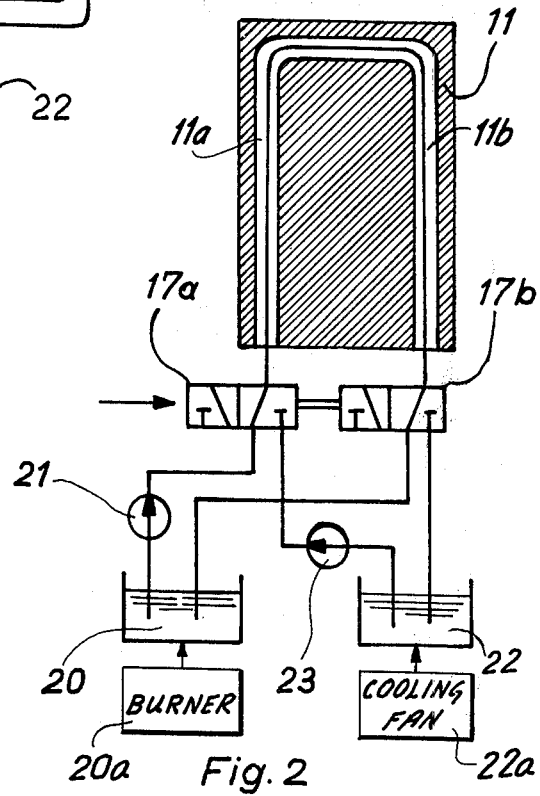
FIG. 2 is a schematic and diagrammatic detail of FIG. 1.

FIG. 2 shows a schematic for the heating and cooling circulations for one element (e.g. 11) of FIG. 1. The valve 17 is shown here in two synchronously operating parts or portions 17a and 17b, one for each duct 11a, 11b. In the illustrated valve position, the ducts 11a and 11b are connected into the heating fluid circulation, while the cooling fluid circulation is positively interrupted. This, however, is correct only as to the one particular stroke element. In reality, there may always one element be connected to the heating fluid circulation, one to the cooling fluid circulation, while the third one is in transition of connection and may also be connected to the heating or to the cooling circulation as required. It will be recalled that in FIG. 1 element 10 is connected to the cooling circulation, but may soon be cut off, while element 11 had just been connected also to the cooling circulation.

The heating circulation includes a heating source 20a for heating fluid which is pumped into the circulation by a pump 21. Specifically, hot fluid is pumpsed through valve 17a into duct 11a and returns from duct 11b through valve 17b to the heat source. The source 20a may be a clean fuel steady operating burner with a BTU output sufficient to maintain a particular temperature of the circulating heat exhchange fluid as being pumped by pump 21. The burner 20a is a completely independent unit. It may, for example, be operated in a feedback loop to maintain, approximately at least, constant temperature of the fluid it heats and which is pumped through the system. One can use gaseous or liquid fuel and operate the burner under minimum polluting conditions with maximum use of its latent energy content.

Upon changing the disposition of valves 17a, b (see arrow in FIG. 2), the heating circulation is cut off from element 11, and the cooling circulation 22 is connected to ducts 11a, 11b through valves 17a, b. A cooled fluid is pumped from a cooling source 22a by means of a pump 23 into duct 11a and back from duct 11b.

The prime input of the cooling circulation may be a fan forcing outside air into heat exchange relation with the cooling fluid, so that the latter gives off thermal energy it receives from the respective element or elements. If the air needed for the burner is taken from that cooling circuit, one may achieve still greater efficiency.

It should be noted that speed regulation of the engine may be carried out, for example, by controlling the pump or pumps 21, 23. The pumps are, of course, driven via the crank-shaft, and their volume of pumped fluid may be valvecontrolled, so that the rate of fluid flow is controlled which in turn controlls heating and cooling speeds. These speeds are the primary factor for rotational speed control. One could also control the temperature of the fluids, but that is a slower process.

Turning now to the second example of the preferred embodiment of the invention as shown in FIG. 3, an engine is illustrated here resembling a swash plate machine with axially parallel pistons, except that this particular machine has no pistons but expanding - contracting, stroke producing, tubular elements 30 and 31. These elements are articulated on one end in a follower disk 34, while they are held in a likewise revolving disk 32 at their other end by means of force - dependent, elastic couplers 38 and 39, respectively. Due to the articulated connection, the resilient connection to disk 32 amounts indirectly to a resilient connection to disk 34. Disk 34 revolves about an axis oblique to, but intersecting the axis of rotation of disk 32, while elements 30, 31 extend parallelly to the latter axis. The disks 32, 34 are journalled in appropriate bearings in a housing 40. Housing 40 has two end plates 35 and 36 constructed as stationary control disks provided with appropriate arcuate slots in disk 35.

Analogously, disk 34 revolves in face to face abutment with disk 36, and ducts 34a, 34b alternatingly align with the openings in disk 36. These ducts in disk 34 terminate inside of the disk in sockets which articulate end balls of the elements 30, 31. These end balls are also traversed by a bore to continue the tubular interior of the tubular elements but with slightly flared ends. Thus, as the end balls change directions, the hollow interior remains in fluid conductive alignment with ducts 34a, 34b throughout.

The respective other ends of tubular elements 30, 31 are slidingly held in short flanged sleeves 38, 39 on disk 32 which in turn communicate with the ducts 32a, 32b.

Inlet and outlet of the cooling circulation are permanently connected to one opening or slot in disk 35 and one opening in disk 36, respectively. Inlet and outlet of the heating circulation are connected to the respective other openings in disk 35, 36. Additional valves are not necessary as the relative movement of disk 32 on disk 35 performs e.g. the inlet valving function, while disk 34 as rotating on disk 36 performs the outlet valving function or vice versa.

It can readily be seen that fluid is passed through each stroke producing element in one direction only. The illustrated disposition of the machine in FIG. 3 shows heating fluid to begin to pass through element 31, while cooling fluid begins to pass through element 30.

As can be taken from FIG. 3a, the crosssection of ducts 32a, 32b must be a little smaller than the distance of the arcuate slots at their ends from each other, so that these ducts 32a, 32b will not interconnect the cooling and the heating circulations. On the other hand, as soon as, for example, duct 32a of rotating disk 32 has completely receded from alignment with one of the arcuate slots in disk 35 it will open passage and connection to the other slot.

It is assumed also that the mechanical memory of the elements is such that cooling permits and will produce contraction, while heating beyond the transition temperature will result in expansive restauration of the respective tube, 30 or 31 as the case may be.

For a full cycle, assume that tube 31 is being heated and its temperature exceeds the transition temperature it expands quite forcefully. Resilient coupler 39 attenuates the impact and causes more gradual conversion of the axial push into rotation, thereby imparting torque upon disks 32 and 34. The resilient couplers 38, 39 are shown in an intermediate position in which they are held by elastic forces, tending to restore that disposition upon deflection therefrom in either direction. The couplers 38, 39 may for instance be spring centered mechanisms or hydraulic pressure loaded elements.

Concurrently to heating of tube 31, tube 30 was cooled, so as to assume its upset, shortened configuration. This in turn provides torque upon the assembly in support of the torque as provided by the expansion of tube 31. After 180° rotation the heating and cooling of the tubes is reversed.

The direction of the resulting rotation is simply the one the rotating structure already has. The relative phase of the various openings bores and ducts in relation to the axes can be selected in relation to the tilt angle of disk 34, so that the correct rotation is assumed from the beginning. The starting position is preferably not dead center, but full or partial alignment of the bores (32a etc.) with the respective slots which place the tubes 30, 31 off - dead center.

It can readily be seen that the mode of operation can be reversed. The elements 30, 31 may be extended when cooled but contract on heating; the phases of operation are simply changed by 180° as between rotation on one hand, and valve operation for connection of heating and cooling circulations on the other hand.

The invention is not limited to the embodiments described above, but all changes and modification thereof not constituting departures from the spirit and scope of the invention are intended to be included.

I claim:

1. Thermo-engine in which thermal energy is converted into mechanical, rotational energy by an output member, comprising:

a plurality of elongated elements which change their length extension under development of a relative high force, when changing temperature beyond a transition temperature or temperature range while permitting length changes in the opposite direction under exertion of relatively little force, when at a temperature oppositely beyond said transition temperature or temperature range;

means including resilient means for coupling said elements to said output member, so that the length changes of the elements are translated into rotational movement imparted upon the output member when at least one element changes length under development of said high force, while causing the opposite length change under exertion of force in one other of the elements as at least the one element changes length under development of force; and means for cyclically and alternatingly exposing said elements to heating and cooling fluids to obtain temperature changes thereof under rapid traversal of said transition temperature or range in each instance to obtain said length changes in each of said directions.

2. Thermo-engine as in claim 1, wherein the elements are being upset under exertion of relatively little force, while expanding under the development of large force.

3. Thermo-engine as in claim 1, wherein the elements are being extended under exertion of relatively small force, while contracting under the development of large force.

4. Thermo-engine as in claim 1, wherein each of the elements is traversed by at least one duct, there being valve means controlled in synchronism with rotation of said rotatable member for alternatingly passing heating and cooling fluids through said elements.

5. Thermo-engine as in claim 1, wherein each element is pivotally supported at at one end and resiliently at the respective other end.

6. Thermo-engine as in claim 1, the last means including means for sustaining steady burning of fuel as heat source for continuously heating the heating fluid, there being valve means for controlling the alternation of exposing the elements to the heating fluid.

7. Thermo-engine as in claim 1, the last means including means for providing cooling air and a heat exchanger for cooling the cooling fluid.

8. Thermo-engine as in claim 1, wherein the cooling fluids differ in temperature by a value which is a multiple of the said transition temperature range.

9. Thermo-engine in which thermal energy is converted into mechanical energy by causing a rotatably mounted element to rotate, comprising a plurality of elongated elements which expand and contract in dependency upon temperature and each restoring to a particular length upon being heated above a critical transistion temperature range, and each including a longitudinal extending duct with externally accessible inlet and outlet;

means including transversely effective elastic couplers for connecting the elongated elements to the rotatable element so that length changes in the elements are converted into rotation of the rotatable element; and means for cyclically alternating passing a heating and a cooling fluid to the inlets of the elements of the plurality with a phase shift to obtain alternatingly contraction and expansion of the elements for causing said rotatable element to rotate.

10. Thermo-engine as in claim 9, wherein the means for cyclically passing include valve means operating in synchronism with the rotation of said element to obtain cyclically alternating passing of heating and cooling fluid through the elements.

11. Thermo-engine as in claim 9, wherein said rotatable element is c crank-shaft, the elongated elements connected with one end thereto by said elastic means, the respective other end of each element being fixed as to longitudinal extensions.

12. Thermo-engine as in claim 11, wherein each elongated element is longitudinally traversed by two ducts communicating in the region of connection of the element to the crank-shaft, the ends of the two ducts at the other end of the shaft being respectively connectable to feed and return paths of heating and cooling fluid circulations of the last means.

13. Thermo-engine as in claim 11, wherein said elements are constructed from material with an elastic temperature-dependent memory each being changed in length by the crank-shaft during one half cycle of rotation, while exerting force upon the crank-shaft during the other half cycle of rotation.

14. Thermo-engine as in claim 9, the rotatable element being a tilted disk to which the elongated elements are articulated by one respective end, the other ends of the elongated elements being connected to a second disk by said disks journalled in a housing and operating as rotating valves, the means for passing being connected to said housing, the elements being tubular for passage of said fluids and in alternating sequence in dependence upon the rotating valves.

15. Thermo-engine as in claim 14, wherein each tubular element is constructed from material with an elastic temperature-dependent memory each being changed in length by said titled disk during one half cycle or rotation while exerting force upon the disk during the other half cycle of rotation.

* * * * *